April 16, 1929.  C. A. BODDIE  1,709,706
SPEED REGULATOR SYSTEM
Filed Sept. 8, 1924
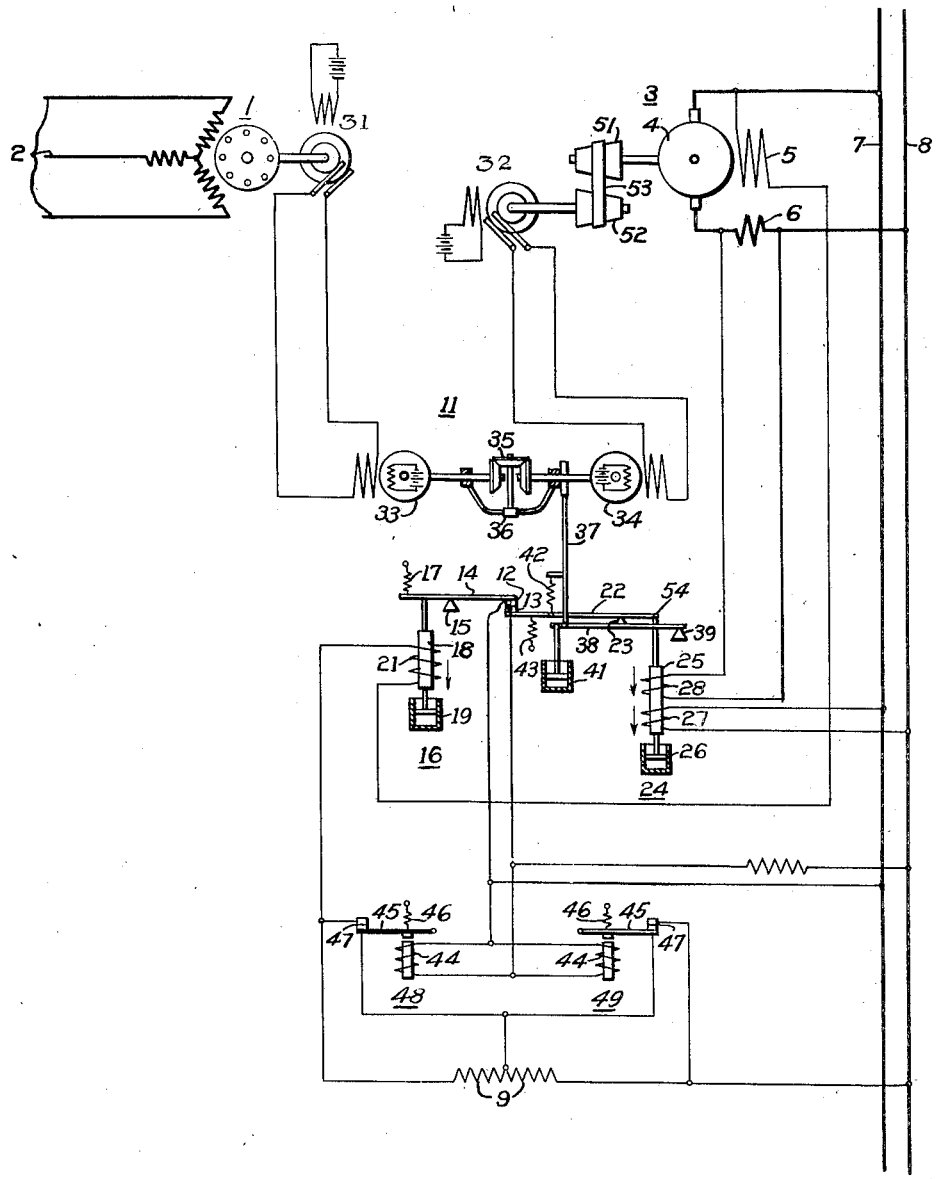
INVENTOR
Clarence A. Boddie.

Patented Apr. 16, 1929.

1,709,706

UNITED STATES PATENT OFFICE.

CLARENCE A. BODDIE, OF WILKINSBURG, PENNSYLVANIA, ASSIGNOR TO WESTINGHOUSE ELECTRIC & MANUFACTURING COMPANY, A CORPORATION OF PENNSYLVANIA.

SPEED-REGULATOR SYSTEM.

Application filed September 8, 1924. Serial No. 736,422.

My invention relates to regulator systems and more particularly to a speed regulator for governing the relative speeds of two motors.

One object of my invention is to so regulate the speed of an auxiliary or controlled motor that it will follow the variations in speed of a main motor.

A further object of my invention is to provide a regulator of the above-indicated character, in which the corrective tendency is cumulative, accurate and quick acting.

Another object of my invention is to provide a regulator of the above-indicated character, wherein the normal speed ratio between the main and the auxiliary motors may be varied.

My invention is especially adapted for use in steel mills wherein it is necessary to drive a reel motor at a given speed with respect to the main or rolling mill motor. In a hot-rod rolling mill, a series of stands of rolls are preferably driven by an induction motor having a large power capacity. The steel passes progressively through the several stands and, as it leaves the stands, is conducted to reels upon which the finished wire product is wound. The maximum speed of the wire as it reaches the reels is in the neighborhood of 3400 feet per minute, so that it becomes necessary to maintain a definite speed ratio between the reel and the rolls of the mill in order to wind the wire properly and to prevent it from jumping from the rack. Furthermore, it becomes necessary, in rolling different sizes of rods or wire, to vary the speed ratio between the reel and the rolls.

Heretofore, it has been customary to drive the reels by a rope drive connected to the main mill motor. In order to change the normal speed ratio between the reel motor and the main motor to accommodate the winding of different sizes of rolled stock, sheaves of different sizes were used, and it became necessary to change the sheaves, which operation requires considerable time. It was also necessary to experiment considerably in making this change in order to obtain the correct speed ratio between the rolls and the reel.

It will be seen, therefore, that in a mill using a motor to drive the stack of rolls and another motor to drive the reel, it is important that the reel motor should run at a speed that depends upon the speed of the main motor and that must follow the speed changes of the main motor with extreme accuracy and promptness. If the reels do not run at the correct speed, the steel may be pulled apart or thrown out of the reels. Considerable speed variations occur with load changes upon the main motor, by reason of its inherent slip, while the load and voltage variations upon the reel motor tend to change its speed. It thus becomes necessary that the speeds of the main and of the reel motor be maintained in proper harmony.

My invention contemplates the use of a regulator of the vibrating type that intermittently short-circuits a resistor in series relation with the field winding of the auxiliary or reel motor. The vibrating regulator is provided with a pair of levers for actuating contact members to control the resistor. One of these levers is controlled by a magnet having a winding in series relation with the field winding of the controlled motor, the magnet thus tending to regulate for constant field current.

The other of these levers is actuated by a magnet having a winding connected in parallel circuit relation to the interpole field winding of the motor. This magnet is sensitive to load changes upon the auxiliary motor and tends to regulate for constant armature current. By the quickness of its response to speed changes following load changes upon the motor, this magnet acts as an anti-hunting device. The lever actuated from the interpole winding is mounted on a floating pivot that is supported upon a third lever, the position of which is adjusted in accordance with the speed variations between the two motors. In order to obtain a measure of the speed variations between the main motor and the reel motor, two single-phase synchronous motors are used, being connected to pilot generators that are respectively driven from the main and from the reel motors. The two synchronous motors operate upon a mechanical differential, the middle element of which actuates the third-mentioned lever to adjust the position of the floating pivot in accordance with speed variations between the two motors.

My invention will be better understood by reference to the accompanying drawing, wherein the single figure illustrates a diagrammatic view of the apparatus embodied in the preferred form of my invention.

In the accompanying drawing, a main or rolling mill motor 1 is illustrated as being energized from a source 2 of alternating-current and an auxiliary or reel motor 3, which is provided with an armature winding 4, a shunt field winding 5, and an interpole series field winding 6, is illustrated as being supplied from a source 7—8 of direct-current energy. A resistor 9 is connected in series circuit relation with the shunt field winding 5, and is controlled by the regulator shown generally at 11.

The regulator 11 comprises a pair of contact members 12 and 13. The contact member 12 is mounted at one end of a lever 14, which is supported upon a fixed pivot 15 and is actuated by an electro-magnet 16 in a downward direction against a tension spring 17. The magnet 16 comprises a core 18 and a cooperating dash-pot 19. Upon the core a winding 21 is provided, which is connected in series circuit relation with the shunt field winding 5 and the resistor 9. The contact member 13 is mounted upon a lever 22, which is supported upon a floating pivot 23 and is actuated in accordance with the energization of an electro-magnet 24. The electro-magnet 24 comprises a core member 25 and a cooperating dash-pot 26 therefor, and a pair of windings 27 and 28. The winding 27 is permanently energized from the direct-current source 7—8, for the purpose of stabilizing the action of the magnet. The winding 28 is connected in parallel circuit relation to the interpole field winding 6 of the auxiliary motor 3, so that its energization is varied in accordance with the load upon the motor 3.

Two single-phase alternating-current pilot generators 31 and 32 are provided, to be operated in accordance with the speeds of motors 1 and 3 and to supply energy to two synchronous motors 33 and 34, which are connected to opposite sides of a mechanical differential device 35. The middle element 36 of the mechanical differential is rotated in accordance with the variations in speed between the motors 1 and 3. One of the end pinions of the element 36 is connected, either by a crank pin, or by gear teeth to actuate a rod 37. This rotative movement is transmitted by means of the connecting rod 37 to a lever 38. One end of the lever 38 is mounted upon a fixed pivot 39. The lever 38 carries a floating pivot 23 and is also provided with a dash-pot 41 for smoothing out any hunting action of the mechanical differential.

The floating lever 22 is provided with a pair of tension springs 42 and 43, one of which is connected to the rod 37 and the other of which is connected to a fixed support, as illustrated. As the position of the rod 37 varies, the tension of the springs 42 and 43 will be varied accordingly and will change the normal or neutral position of the contact member 13. The contact members 12 and 13 of the regulator control a pair of relays 48 and 49 for shunting sections of the resistor 9. A plurality of relays are provided so as to diminish the voltage drop across the relay contact members. Relays 48 and 49 are each provided with an electro-magnet winding 44, which is energized from the direct-current supply 7—8, and with an armature 45, which is operated against a tension spring 46 to open contact members 47. Closing the contact members 12 and 13 shunts the windings 44 of the relays, thus permitting the spring members 46 to close contact members 47 and short-circuit the resistor 9. In order to change the normal speed ratio between the motors 1 and 3, a speed-changing device is provided to vary the speed of pilot generator 32 relative to the speed of the auxiliary motor 3. The speed-changing device illustrated comprises a pair of cone pulleys 51 and 52, and a belt 53 therefor, although any other suitable means for varying the speed ratio between the pilot generator 32 and the auxiliary motor 3 may be substituted.

The operation of my device is as follows: The field magnet control device 16 operates as a constant-current regulator to maintain a constant field strength upon the motor 3, the particular value of this field strength depending on the position of the lower contact member 13. The contact member 13 is actuated in accordance with the energization of the interpole winding 6, being assisted by the operation of the spring 42 and opposed by the operation of a spring 43. Electro-magnet 24, therefore, operates in a similar manner as a constant-current regulator to maintain a constant energization of the armature circuit of the motor 3.

There are thus two regulators, one regulating to maintain a constant current field and the other to maintain a constant current in the armature circuit of the auxiliary motor. The particular values of field and armature current depend upon the position of the lever 38 and upon the relative strength of the spring members 42 and 43. When the difference between the two motor speeds is changing slowly, the differential element 36 moves slowly, thereby changing the settings of the lever 38 and the tension upon spring 42 and 43, so that the magnets 16 and 24 regulate for different field and armature currents. However, when a sudden speed change takes place, the movement of the mechanical differential is correspondingly faster, maintaining the contact members 12 and 13 in an open or closed position for a longer period of time.

Assume now that the regulator is in operation and that a heavy load comes on the reel motor. It is necessary under this circumstance to reduce the field strength in order to maintain the speed at this increased load. The motor speed would immediately decrease, causing the differential to move the lever 38 rapidly in a downward direction. The movement of the lever 38 causes the lever 22 to pivot momentarily at the point 54, and instantly separate the contacts 12 and 13 thereby changing the field current, and at the same time changing the relative tension of the springs 42 and 43. The rapid change in load upon the motor with a corresponding change in armature current causes the core 25 to move downward in the coil 28.

It will be understood that the auxiliary motor follows the main motor with a synchronous motor characteristic. That is, changes in load upon the auxiliary motor causes the motor armature to change its phase position. An increase in load causes the motor armature to fall back from its no load position by an amount sufficient to admit current enough to develop a torque commensurate with the resistance of the load.

This change in phase position causes the differential arm of the regulator to assume a new position, which position is communicated to the lever 38. The corresponding change in spring tension of the springs 42 and 43 also changes the neutral or balanced position of the contact member 13 and cause the regulator to vibrate at a new rate.

Many changes may be made in the details of the apparatus disclosed without departing from the spirit or scope of my invention, and I do not wish to be limited other than by the scope of the appended claims.

I claim as my invention:

1. In a regulator system, a dynamo-electric machine, reglating means therefor comprising a pair of co-operating contact members, means comprising a pair of levers one for operating each of said contact members, and means for actuating said levers in accordance with different electric quantities of said dynamo-electric machine, one of said levers being mounted upon a floating pivot and being provided with means normally biasing said lever to a predetermined position, a support for said floating pivot, and means for actuating said support in accordance with changes in the regulated quantity.

2. In a regulator system, a dynamo-electric machine, regulating means therefor comprising a plurality of contact members, means for actuating said contact members, a floating pivot for supporting one of said members, means for biasing one of said contact members to a predetermined position and for actuating said floating pivot, said last named means being actuated in accordance with variations in the regulated quantity.

3. In a regulator system, a dynamo-electric machine, regulator means therefor comprising a plurality of contact members, a pair of levers for supporting said contact members, a floating pivot for supporting one of said levers, a member actuated in accordance with variations of the regulated quantity of said dynamo-electric machine for varying the position of said floating pivot, and means actuated by said last named member for biasing one of said levers.

4. In a regulator system, a dynamo-electric machine, regulator means therefor comprising a plurality of contact members, a pair of levers for carrying said contact members, a third lever and a floating pivot carried thereby for supporting one of said first named levers, a member actuated in accordance with speed variations of the regulated quantity for varying the position of said third lever, and means for biasing one of said pair of levers in accordance with movements of said member.

In testimony whereof, I have hereunto subscribed my name this 3rd day of September, 1924.

CLARENCE A. BODDIE.